Figure 4:
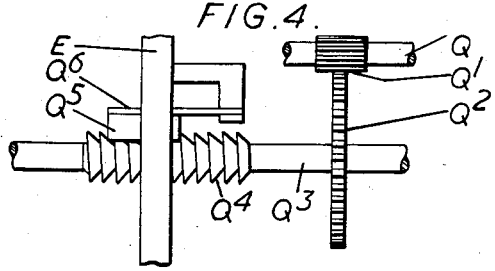

Feb. 21, 1961  R. E. REASON  2,972,250
SURFACE TESTING APPARATUS
Filed June 16, 1958  4 Sheets-Sheet 1
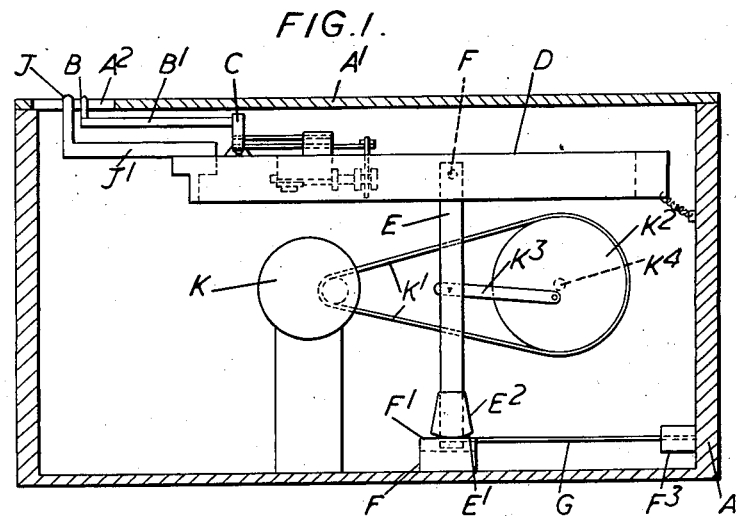
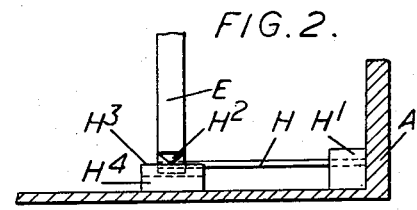
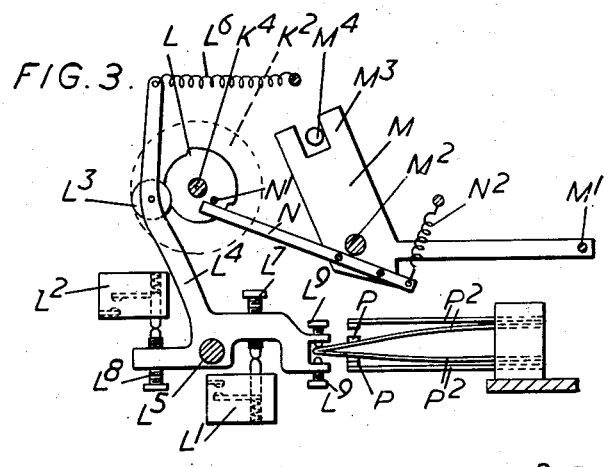
Inventor
R. E. REASON
By
Holcombe, Wetherill & Brisebois
Attorneys Feb. 21, 1961 R. E. REASON 2,972,250
SURFACE TESTING APPARATUS
Filed June 16, 1958 4 Sheets-Sheet 3

Inventor
R. E. REASON
By
Holcombe, Wetherill & Brisebois
Attorneys

Feb. 21, 1961 R. E. REASON 2,972,250
SURFACE TESTING APPARATUS
Filed June 16, 1958 4 Sheets-Sheet 4
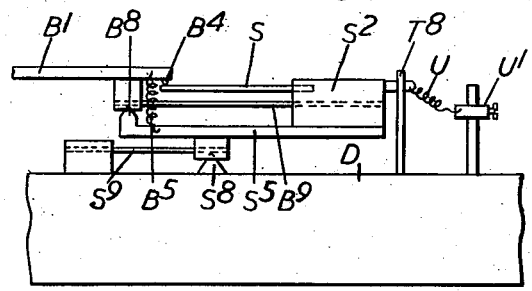
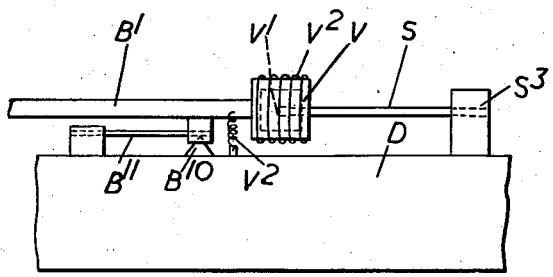
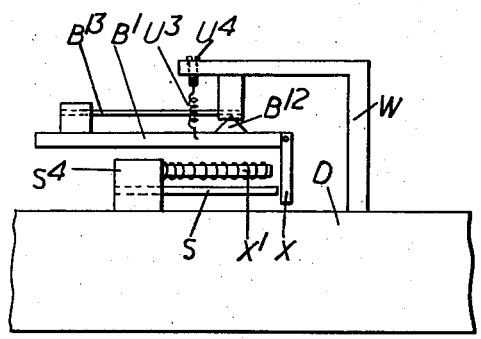
Inventor
R. E. REASON
By
Holcombe, Wetherill & Brisebois
Attorneys

United States Patent Office 2,972,250
Patented Feb. 21, 1961

2,972,250

SURFACE TESTING APPARATUS

Richard Edmund Reason, Leicester, England, assignor to Taylor, Taylor & Hobson Limited, Leicester, England, a company of Great Britain Filed June 16, 1958, Ser. No. 742,415

Claims priority, application Great Britain June 17, 1957

20 Claims. (Cl. 73—105)

This invention relates to apparatus for measuring or indicating the roughness or undulations of a surface. In such apparatus, the pick-up unit includes means for traversing a stylus across the surface to be tested, the stylus being coupled to a detector device so that, during traversing, the working movements of the stylus approximately normal to the test surface are transmitted to the detector device for measurement relatively to a suitable datum. It is often desired to employ as detector device a piezo-electric element or other device which is relatively "stiff," that is, offers considerable resistance to more than a very small movement. With such a device, difficulty frequently arises in providing a suitable mounting for the stylus and the detector device, which shall be such as to accommodate the relatively large movements necessary for initial adjustment to bring the stylus into proper operative engagement with the test surface with the desired contact pressure, without at the same time making the device so flexible as to lower its sensitivity to the small working movements of the stylus during the actual traversing.

The object of the present invention is to provide improved surface testing apparatus whereby the above described difficulty can be satisfactorily overcome.

The measuring or indicating apparatus, according to the present invention, comprises a stylus urged into engagement with the surface to be tested, a pick-up head affording a datum for the working movements of the stylus approximately normal to the test surface, means for driving the pick-up head and thereby traversing the stylus across the test surface, a detector device, two normally operative connections respectively between the stylus and the detector device and between the detector device and the pick-up head, at least one of such connections including a yieldable or breakable coupling for rendering the detector device relatively unresponsive to the working movements of the stylus, clamping means which can be operated to make the yieldable or breakable coupling operative and thereby to render the detector device responsive to the working movements of the stylus during the traversing movement, and a measuring or indicating instrument operated by the detector device.

The clamping means is preferably operated electromagnetically.

Conveniently, the yieldable or breakable coupling includes a member which, when the coupling is unclamped, is free to move about a pivot axis parallel to the test surface, and the clamping means comprises a pair of jaws which when operated exert a gripping force on such member in a direction parallel to such pivot axis. Preferably, in such case, the two clamping jaws and the member between them are made of magnetisable material and form part of a magnetic circuit linked with an operating coil or coils, whereby energisation of such coil or coils will cause the two jaws to move into gripping engagement with the member.

The detector device is preferably constituted by an element having piezo-electric properties. Such element may conveniently be bar-shaped, cooperating at one end with the operative connection to the stylus, whilst the other end carries or is rigidly connected to the member which is gripped between the two clamping jaws.

In one construction, the operative connection between the stylus and the detector device comprises a stylus support rigidly connected to the detector device, and the yieldable coupling, when not clamped, permits the stylus support and stylus and the detector device to move as a unit relatively to the pick-up head in a plane approximately normal to the test surface. Preferably, the unit comprising the detector device and the stylus support and stylus is pivotally connected to the pick-up head about an axis approximately parallel to the test surface. For example, the detector device, at a point thereof remote from its connection to the stylus support, may be rigidly connected to a detector support pivotally connected to the pick-up head about an axis approximately parallel to the test surface, the clamping means acting to clamp the detector support to the pick-up head in a position in which the stylus is maintained in engagement with the test surface.

In another construction, the stylus and the detector device are respectively carried by a stylus support and by a detector support, and each such support is pivotally connected to the pick-up head about an axis approximately parallel to the test surface, the stylus support being maintained in abutting engagement with the detector device so that the yieldable coupling, when not clamped, permits the stylus and the detector device to move relatively to each other and to the pick-up head.

In all these constructions, the stylus may be urged into engagement with the test surface by spring means acting directly on the stylus support. Alternatively, when the detector device is carried by a detector support pivoted to the pick-up head, and when a piezo-electric element is employed as a detector device, spring means acting on the detector support may, when the yieldable coupling is not clamped, cause the stylus to be urged into engagement with the test surface and the detector element to be stressed, whereby when the spring means is cut out of action by the clamping means the stylus remains urged into engagement with the test surface by the stressing of the detector element.

Conveniently, a starting device may be provided for initiating a traversing movement, when the stylus and the test surface have been brought into engagement with the yieldable or breakable coupling unclamped, the clamping means being operated automatically after operation of the starting device. Such starting device may conveniently be utilised to initiate an automatic cycle of operations, operation of such device closing an electric switch for energising an electric motor, from which the traversing drive is derived, such motor also driving a cam controlling the sequential operation of a number of electric switches at appropriate intervals, whereby the clamping means is operated, an operative connection from the detector device to the measuring or indicating instrument is established and is subsequently broken, the clamping means is released, and finally the switch controlling the motor is opened to deenergise the motor, the motor acting to cause the operative traversing movement of the stylus to be effected while the operative connection to the instrument is established and thereafter to cause the pick-up head to be returned to its starting position in readiness for the subsequent initiation of a new cycle.

The invention may be carried into practice in various ways, but some alternative arrangements of measuring or indicating apparatus according thereto will now be described with reference to the accompanying drawings, in which Figure 1 shows diagramatically one arrangement of the measuring or indicating apparatus in side elevation, Figure 2 shows a modified form of mounting for one end of the driving arm.

Figure 5:
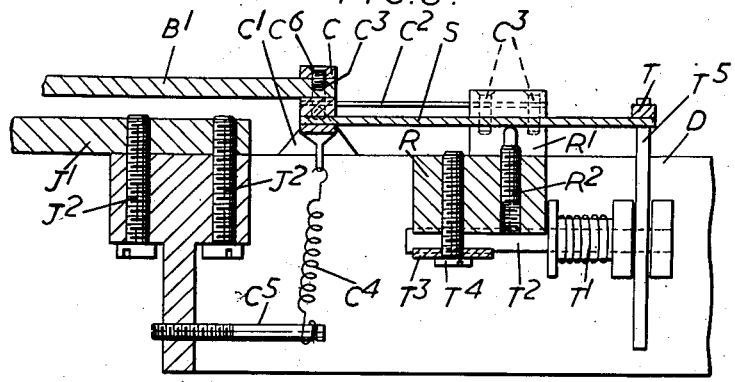
Figure 6:
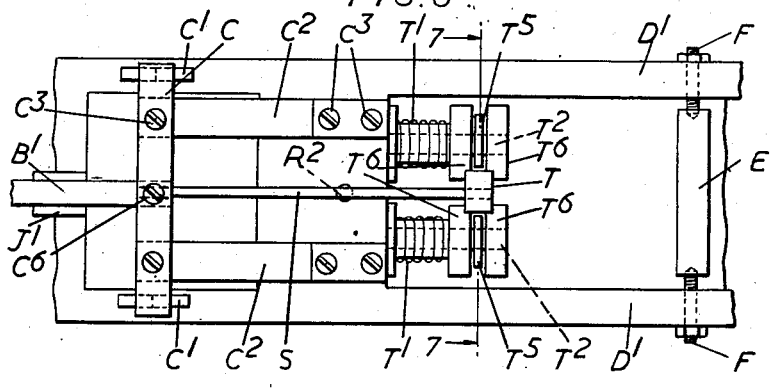
Figure 7:
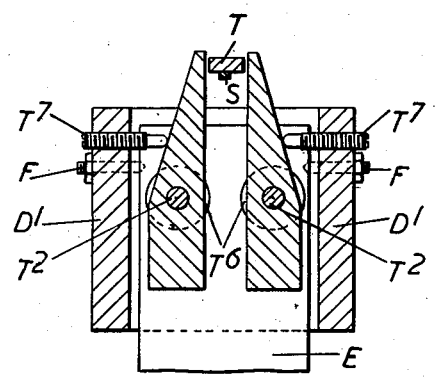

Figure 3 shows a switch mehcanism operable by the drive to the driving arm (viewed from the direction opposite to that of Figure 1), Figure 4 shows an alternative form of drive for the driving arm, Figure 5 is an enlarged view in vertical section of the preferred arrangement of pick-up unit shown in Figure 1, Figure 6 is a plan view of the pick-up unit shown in Figure 5, Figure 7 is a sectional view of the preferred pick-up unit on line 7—7 of Figure 6, and Figures 8–12 respectively show diagrammatically five modified arrangements of pick-up unit.

In the arrangement of Figure 1, the apparatus for testing the roughness or undulations of a surface is carried in casing A having a generally flat top plate $A^1$ which constitutes a work table on which the body carrying a nominally flat surface to be tested is placed. This top plate $A^1$ is provided with a slot $A^2$ through which projects a stylus B having a sharp metal tip (for example 0.0002 of an inch). The stylus B is carried at one end of a supporting arm $B^1$ and is directed upwardly from such arm so that its tip is approximately level with the work table $A^1$. The stylus arm $B^1$, at its end remote from the stylus B, is mounted on a cross-piece C whose length extends at right angles to the length of the stylus supporting arm $B^1$, such cross-piece C being pivoted about an axis parallel to its length to a hollow pick-up head D extending generally parallel to the top plate $A^1$ beneath such top plate $A^1$. The pick-up head D is pivotally connected at an intermediate point in its length to the upper end of a driving arm E which at its lower end carries a rounded bearing surface $E^1$ maintained in rolling engagement with a plane guide surface $F^1$ carried on an upward projection F from the base of the casing A. The stylus arm $B^1$ extends lengthwise parallel to the pick-up head D between such pick-up head D and the top plate $A^1$. Conveniently, as more especially shown in Figures 6 and 7, the pivotal connection between the pick-up head D and the driving arm E comprises a pair of inwardly-directed screw plugs F projecting through the side walls $D^1$ of the hollow pick-up head D, such pointed projections F gripping between them the driving arm E, at the end thereof remote from the rounded bearing surface $E^1$, so as to define a pivotal axis at right angles to the length of the pick-up head D. The other end of the driving arm E is secured to one end of a spring ligament G which extends lengthwise substantially in the plane of the guide surface $F^1$ on which the bearing surface $E^1$ is to roll and which at the other end is secured in the plane of such guide surface $F^1$ to an inward projection $F^3$ on the side of the casing A. Preferably, as indicated in Figure 1, the rounded bearing surface $E^1$ is defined by the rounded lower edges of two plates $E^2$ carried by the lower end of the driving arm E on opposite sides thereof. The upward projection F carrying the plane guide surface $F^1$ is recessed between the plane of the two plates $E^2$ to receive the lower end proper of the driving arm E, one end of the ligament G being secured to such lower end in the plane of the guide surface $F^1$. The ligament G is of such size and dimensions that, while it is substantially rigid in or approximately in the guide plane, and thus substantially prevents sliding movement between the rounded bearing surface $E^1$ and the guide surface $F^1$, it is sufficiently flexible in a direction at right angles to the guide plane readily to permit rotational movement of the driving arm E about the axis of curvature of its rounded bearing surface $E^1$. This bearing surface $E^1$ is cylindrically curved about the axis of the pivotal connection of the pick-up head D to the driving arm E, such an axis being defined by the pointed projections F as above mentioned, so that when rolling occurs, such pivotal connection will move in a straight line path parallel to the guide surface $F^1$.

If desired, instead of using a cylindrical bearing surface at the end of the driving arm E remote from the pick-up head D, a knife-edge and ligament hinge connection may be employed. For example, in the arrangement of Figure 2, a spring ligament H is connected between the lower end of the driving arm E and an upward projection $H^1$ from the base of the casing A so that such ligament H effectively constitutes a hinge on which the driving arm E can pivot. The driving arm E is independently supported on the base of the casing A by means of a pair of knife-edges $H^2$ carried by the lower end of the driving arm E on opposite sides thereof, such knife-edges $H^2$ engaging with a pair of contact faces $H^3$ carried on an upward projection $H^4$ from the base of the casing A. The projection $H^4$ is recessed between the contact faces $H^3$ to receive the lower end proper of the driving arm E to which one end of the ligament H is secured. With this arrangement, it will be clear that the pivotal connection of the pick-up head D to the driving arm E will move in an arcuate path, the degree of approximation to a straight-line path depending on the length of the driving arm E.

The apparatus is preferably mounted so that the base of the casing A and the work table $A^1$ are horizontal and the driving arm E extends generally vertically. The pick-up head D carries a supporting arm $J^1$ extending lengthwise parallel to the length of the pick-up head D beneath the stylus supporting arm $B^1$, such arm $J^1$ carrying a skid J, of relatively large radius (for example one inch) compared with that of the stylus B, extending upwardly through the slot $A^2$ in the work table $A^1$ adjacent to the stylus B. The pick-up head D is balanced about the upper end of the driving arm E and a spring $D^2$ anchored to the casing A acts on the pick-up head to cause the skid J to be urged upwardly to bear against the surface to be tested when the body carrying such surface is placed on the work table $A^1$.

The driving arm E is driven at an intermediate point in its length so as to move in a direction substantially parallel to the length of the pick-up head D, whereby the upper end of the driving arm E is caused to move substantially in a straight line, carrying the pick-up head D with it. The skid J is thus caused to traverse the test surface in a substantially straight line, such skid J being constantly urged upwardly by the above mentioned spring $D^2$ acting on the pick-up head D about the pivotal connection thereto at the upper end of the driving arm E.

As shown in Figure 1, the driving arm E may conveniently be driven by means of an electric motor K driving, through a driving belt $K^1$, a fly wheel $K^2$ to which the driving arm E is coupled by a crank rod $K^3$. The shaft $K^4$ carrying the fly wheel $K^2$ may if desired carry a cam L for controlling the operation of an integrating meter for indicating the average roughness of the test surface (the manner in which the stylus movements are transmitted to the meter being described below). An arrangement for this purpose is shown in Figure 3 and conveniently, in this arrangement, the cam L is also used to control a switch $L^1$ for the driving motor K and a switch $L^2$ for a clamp (to be later described) which when operated completes a coupling through which the stylus movements are transmitted to the integrating meter. Movements of the cam L is initiated by means of a lever M operated by a handle (diagrammatically indicated at $M^1$) from outside the casing A. The lever M is pivoted at an intermediate point $M^2$ to the casing A and at its end has a forked portion $M^3$ co-operating with a fixed stop $M^4$ for limiting movement of the lever M in either direction. The lever M carries a latch arm N extending towards the cam L, such arm N, when the lever M is moved from its rest position, engaging with a detent $N^1$ on the cam L so as to cause a small rotation of the cam L sufficient to cause operation of the motor switch $L^1$ in the manner to be described. A spring $N^2$ acts on the lever M through the arm N normally to keep the lever M in its rest position. The cam L cooperates with a roller $L^3$ carried on a switch-operating lever $L^4$ pivoted at $L^5$ to the casing A, the roller $L^3$ being maintained in engagement with the cam L by a spring $L^6$ acting on the lever $L^4$ on the side of the roller $L^3$ remote from the pivot $L^5$. The lever $L^4$ carries two contact-operating elements $L^7$ and $L^8$ respectively for operating the motor switch $L^1$ and the clamp switch $L^2$, and also, on the arms of a forked portion of such lever $L^4$, a pair of aligned contact-operating elements $L^9$ for controlling two pairs of contacts P and $P^1$ for the integrating meter. Each contact of the contact pairs P and $P^1$ is conveniently carried on one end of a spring arm $P^2$ fixed at the other end with respect to the casing A. When the lever M is in its rest position, the contact pair P is closed and the integrating meter is short circuited.

Thus, in order to perform an indicating or measuring operation, the lever M is rotated by hand through a small angle sufficient to cause the lever $L^4$ to make the small rotation necessary to operate the motor switch $L^1$. The motor then continues the drive, the latch arm N disengaging from the detent $N^1$ so that the lever M can return to its normal rest position. Shortly after the motor K has taken over the drive, the further rotation of the cam L causes the lever $L^4$ to operate the clamp switch $L^2$, thereby completing the coupling through which the movements of the stylus B are transmitted to the meter. After rotation of the cam through about 90°, the lever $L^4$ is rotated sufficiently to have opened the contact pair P and to close the contact pair $P^1$, thereby preparing the integrating circuits for reception of the signals to be received in accordance with the stylus movements. The closing of the contact pair $P^1$ may conveniently cause the meter to be reset to its zero position. After rotation of the cam L through about 225°, the contact pair $P^1$ is opened, whereafter the signal received due to movements of the stylus is integrated. Rotation of the cam L through a further 90° causes closing of the contact pair P, whereby the meter is short-circuited and is thereafter held set at the recorded reading. Further rotation of the cam L opens the clamp switch $L^2$ and then the motor switch $L^1$ just before the cam is restored to its starting position. During the rotation of the cam L, it will be appreciated that the skid J and the stylus B will have been slowly traversed at a uniform speed along a substantially straight-line path on the test surface for the operative measuring stroke and during the remainder of the revolution will have been brought back to the starting position. The cam drive and switching mechanism associated therewith are mounted in the casing A to one side of the driving arm E.

The means for driving the driving arm E may alternatively consist, as shown in Figure 4, of a motor driven shaft Q driving, through reduction gearing $Q^1$, $Q^2$, a second shaft $Q^3$ carrying at one end a buttress thread $Q^4$. A correspondingly threaded half-nut $Q^5$ engages with such buttress thread $Q^4$ and is spring-urged into cooperation therewith by means of a spring ligament $Q^6$ carried by the driving arm E at an intermediate point in its length, the force exerted by the spring being adequate to hold the half-nut $Q^5$ in driving engagement with the buttress thread $Q^4$ through the whole operative range of movement. In the reverse direction, the pick-up head D can be pushed back to its starting position, the half-nut $Q^5$ riding over the threads of the shaft $Q^3$. If desired, means for driving a shaft carrying the switch controlling cam L may be provided on the shaft $Q^3$. Such cam and drive therefore, if provided, will again preferably be mounted in the casing A to one side of the driving arm E.

The use of an integrating meter operated in the above-described manner, with a single relatively slow traverse of the stylus, to give the desired average roughness reading is much to be preferred, but other forms of measuring or indicating instrument can be used, if desired. Thus, for instance, in one alternative, the stylus is moved relatively quickly over the surface and is reciprocated back and forth thereon, a heavily-damped voltmeter being employed to give a reading of the average roughness. It is also possible, if desired, to obtain a trace of the surface roughness, instead of an average reading, by employing a cathode ray oscillograph or a pen recorded as the measuring instrument.

The pick-up head D is shown on an enlarged scale in Figures 5, 6 and 7. As has been previously mentioned, such pick-up head D consists of a hollow body pivoted at an intermediate point in its length to the upper end of the driving arm E. The skid supporting arm $J^1$ is mounted on one end of such hollow pick-up head D by means of two securing screws $J^2$. The stylus supporting arm $B^1$, which at one end is secured by means of a screw $C^6$ to the cross-piece C mentioned earlier, is pivoted relatively to the pick-up head D by means of a knife-edge and ligament hinge connection. Thus, the pick-up head D carries two horizontal knife-edges $C^1$ transverse to the length of the pick-up head and each cooperating with the flat underside of one end of the cross-piece C. A pair of spring ligaments $C^2$ are secured at one end to the cross-piece C near the ends thereof but between the two knife-edges $C^1$ substantially in the horizontal plane defined by such knife-edges, such ligaments $C^2$ being secured at their other ends in the same horizontal plane to upward projections $R^1$ from a cross-support R within the pick-up head D. Screws for securing the ligaments $C^2$ in position are indicated at $C^3$. The ligaments $C^2$ act to minimise slip at such knife-edges $C^1$. In order to keep the cross-piece C in engagement with the knife-edges $C^1$, a spring $C^4$ acts to urge the cross-piece downwardly, the anchorage $C^5$ for such spring $C^4$ being mounted in the pick-up head D so as to be adjustable in the direction of the length of the pick-up head D. In this way, the position of the anchorage $C^5$ can be adjusted so that the stylus B is lightly urged upwardly with respect to the pick-up head D and the skid J with the required stylus pressure. The cross-piece C, between the ligaments $C^2$, carries a detector device constituted by a piezo-electric element S which extends away from the cross-piece C in the opposite direction to the stylus supporting arm $B^1$ and passes between the upward projections $R^1$ from the cross-support R. An adjustable stop $R^2$ projects upwardly from the cross-support R within the pick-up head D to engage the detector element S at an intermediate point in the length thereof. The detector element S rests on the stop $R^2$ and thus the level of such stop $R^2$ determines the initial or nominal projection of the tip of the stylus B beyond the tip of the skid J. The detector element S is electrically connected through an amplifier to an indicating device (which may for example be constituted by the meter previously mentioned) by means of which the variations in the electric potential difference developed across such piezo-electric element as its flexure changes can be measured.

The end of the detector element S remote from the cross-piece C, beyond the projections $R^1$ from the pick-up head D, carries a small plate-like armature T of magnetisable material lying in a horizontal plane. Adjacent thereto, the pick-up head D carries clamping means which, when operated (for example by means of the cam-operated switch previously described), fixedly locate a line through the plate-like armature T parallel to the axis of the pivot for the cross-piece C carrying the stylus B and the detector element S. As shown in Figures 5, 6 and 7, such clamping means comprises a pair of magnetisable cores $T^2$ which are clamped in grooves in the underside of the cross-support R carried by the pick-up head D by means of a magnetisable clamping plate T³ held by a clamping screw T⁴. Each core T² also constitutes a shaft on which pivots a clamping arm T⁵ of magnetisable material which extends upwardly from the shaft T² to one side of the plate-like armature T. The magnetic circuit through the cores T², the clamping plate T³, the clamping arms T⁵, the armature T and the air gaps on each side thereof, is energised by current through coils T¹ carried on bobbins T⁶. When such coils T¹ are energised, the clamping arms T⁵, pivoted on their supporting shafts T², are drawn towards each other, thereby gripping the armature T between them substantially along a single line. Stops T⁷ (for clarity omitted in Figure 6 but shown in Figure 7) are provided to limit the gap between the clamping arms T⁵ and the armature T when the coils T¹ are not energised. If desired, weak return springs (not shown) may be used for returning the clamping arms T⁵ to their rest positions when the coils T¹ are deenergised.

It will be appreciated that, when the clamping means is operated, the position of the armature T relative to the pick-up head D is held fixed, and the stylus support B¹ and the detector element S carried by the cross-piece C are no longer able to pivot relatively to the pick-up head D without flexing the detector element S.

The operation of the apparatus, and in particular, the pick-up unit, will now be described, assuming a body carrying the test surface to have been placed in the required position on the work table. As above mentioned, the skid J carried by the pick-up head D is lightly urged by the spring D² previously mentioned into contact with the test surface. The biassing spring C⁴ on the cross-piece C will have been adjusted so that the stylus B is pressed against the test surface with the requisite light force, and the adjustable stop R² will have been adjusted so that the stylus B initially projects beyond the skid J to the required extent. The driving means is then started up and the clamping means operated, for example by means of the switch L² controlled by the cam-operated lever described with reference to Figure 3, the clamping means thereafter acting so as fixedly to locate one end of the detector element S relatively to the pick-up head D. The stylus B is still held in engagement with the test surface by the action of the biassing spring C⁴ and, at the time of operation of the clamping means, the detector element S will be unstressed. The driving means causes the pick-up head D to be traversed in a substantially straight line along the test surface, and during such traversing movement, the stylus B moves up and down in a direction approximately normal to the test surface and relatively to the pick-up head D in accordance with the roughnesses of the surface, such working movements causing flexure of the piezo-electric element to a varying extent, in one direction or the other in accordance with the movement of the stylus relatively to the position it occupied at the moment of clamping, whereby such element supplies a varying electrical output which is utilised to operate the measuring or indicating instrument.

The above construction of measuring or indicating apparatus may be modified in various ways within the scope of the invention, more particularly in respect of the mounting of the stylus and of the detector on the pick-up head.

Figure 8:
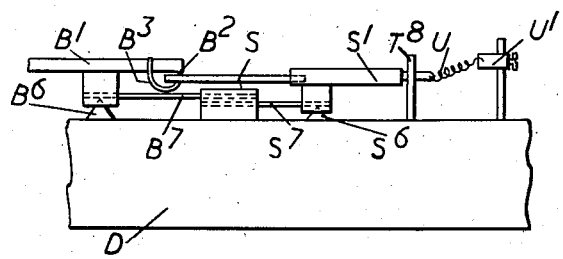

Thus, in one alternative construction, shown in Figure 8, the stylus supporting arm B¹ is itself pivoted to the pick-up head D by means of a knife-edge and ligament hinge connection (indicated at B⁶ and B⁷) and the detector element S is carried on a detector supporting arm S¹ which is independently pivoted to the pick-up head D by means of a second knife-edge and ligament hinge connection (indicated at S⁶ and S⁷). The end of the stylus support B¹ remote from the stylus B slightly overlaps the end of the element S and is provided with a projection B² which is held in abutting engagement with the surface of the element S by means of a spring clip B³, thus ensuring that the two overlapping ends will always make corresponding movements. The end of the detector support S¹ remote from the detector element is urged upwardly by means of a spring U so that the stylus B will be urged upwardly with respect to the pick-up head D and the skid with the desired stylus pressure. Conveniently means are provided for adjusting the position of the abutment U¹ for such spring U. With this arrangement the detector element S when the clamping means (which is indicated diagrammatically at T⁸ and may be arranged in the manner previously described) is operated, is in a stressed condition owing to the fact that the biassing spring U acting to urge the stylus B upwardly acts through such element S. Thus, after such clamping means has been operated, the stylus B is held in engagement with the test surface owing to such flexure of the element S, which will clearly give rise to a stylus pressure the same as that originally provided by the spring U. During the traversing movement, the movements of the stylus B cause the flexure of the element S to vary with respect to its initial flexure, and such variations are measured in the same manner as in the previous arrangement.

Figure 9:
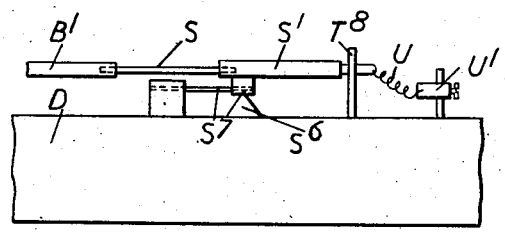

In a further arrangement shown in Figure 9, the detector element S is mounted in a detector support S¹ which is pivoted to the pick-up head D by means of a knife-edge and ligament hinge as in the previous construction (the knife-edge being indicated at S⁶ and the ligament at S⁷) and the stylus support arm B¹ is rigidly carried on the end of the element S remote from the detector support S¹. A similar form of clamping means is employed, such clamping means T⁸, when operated, acting to clamp the detector support S¹ to the pick-up head D. When the clamping means is not operative, the detector support S¹ carrying both the element S and the stylus support arm B¹ with it is permitted to rotate relatively to its pivot to the pick-up head D, and the biassing spring U again has an adjustable anchorage U¹ so that the spring force, in this case acting to bias the end of the detector support S¹ remote from the element S downwardly, acts to urge the stylus B upwardly into engagement with the test surface with the required force. It will be appreciated that the flexure of the element S produced by such adjustment will be in the opposite sense in this construction to that of the flexure produced in the previous construction, and that in this case, as in the previous case, the recorded electrical output during traversing is due to the changes in flexure from the flexure produced by such initial adjustment.

In a further construction, shown in Figure 10, the detector support is in the form of an arm S⁵ of rather greater length than in the last two described constructions, the detector element S being carried by a projection S² on such arm S⁵ and extending parallel to and above such arm S⁵ towards the stylus support arm B¹ which is itself pivoted to the end of the detector support arm S⁵ by means of a knife-edge and ligament hinge connection (indicated at B⁸ and B⁹). The end of the stylus support B¹ remote from the stylus B overlaps the end of the detector element S remote from its mounting and is kept in abutting engagement therewith by means of a knife-edge-like projection B⁴ carried on such end of the stylus support B¹ and a spring B⁵ acting between the stylus support B¹ and the detector support S¹. The detector support arm S⁵ is pivotally connected to the pick-up head D by means of a knife-edge and ligament hinge (indicated at S⁸ and S⁹), and clamping means T⁸ of the kind earlier described is employed. A biassing spring U (again having an adjustable anchorage U¹) when the clamp is not operative, acts downwardly on the end of the detector support arm S⁵ remote from the stylus support B¹ so as to urge the stylus B upwardly into engagement with the test surface, the detector support S⁵ and the stylus support B¹ rotating about their respective pivots with related movements.

In Figure 11 is shown a further construction in which the detector element S is carried on a fixed support S³ mounted on the pick-up head D and the stylus support arm B¹ is pivotally connected to the pick-up head D by means of a knife-edge B¹⁰ and a ligament B¹¹, the clamping means being mounted on the end of the stylus support arm B¹ remote from the stylus B and serving to clamp the detector element S to the stylus arm B¹. Such clamping means may conveniently comprise a chamber V carried on the stylus support arm containing a magnetic paste or powder V¹ into which the end of the detector element S extends. Field coils V² are provided for magnetising the material V¹ contained in the chamber V so as to render such material effectively solid and thus to clamp the end of the element S in position relatively to the stylus support arm B¹. When the field coils V² are not energised, the end of the element S can move through the magnetisable paste or powder V¹ as the stylus support arm B¹ pivots about its connection to the pick-up head D. In this construction, a biassing spring U² acts on the stylus support arm B¹, whether the clamping means is operative or inoperative, to keep the sylus B in engagement with the test surface.

In another construction, shown in Figure 12, the pick-up head D carries a fixed detector support S⁴ from which the detector element S extends in a direction away from the stylus, and the stylus support arm B¹, pivoted (by means of a ligament knife-edge pivot of the kind above described and indicated at B¹² and B¹³) to a bracket W on the pick-up head D passes over the detector element S, so that its end remote from the stylus B lies substantially vertically above the free end of the detector element S. At such end, the stylus support arm B¹ has pivoted to it a clamping arm X of magnetisable material which normally hangs freely so that the stylus support arm B¹ can rotate about its pivot, a biassing spring U³ acting on the stylus support arm B¹ to urge the stylus against the test surface with the desired light pressure. Conveniently, the anchorage U⁴ for such spring U³ is adjustably mounted on the bracket W. The detector support S⁴ also carries an electro-magnet X¹ which, when energised, acts to press the clamping arm X tightly against the free end of the detector element S, so that the working movements of the stylus B, during the traversing operation, result in changes in flexure of such element S.

It will be appreciated that the above described arrangements are by way of example only and that the apparatus may also be modified in other ways within the scope of the invention. Thus, the detector device need not be constituted by a piezo-electric element, but may take the form of any other relatively stiff device capable of producing a voltage change when one part of it is subjected to movement. Again, the mounting of the pick-up head on the driving arm, and the means for driving such arm, may be replaced by other mechanism capable of driving the pick-up head in an approximately straight line.

What I claim as my invention and desire to secure by Letters Patent is:

1. Apparatus for measuring or indicating the roughness or undulations of a surface, comprising a stylus, means for urging the stylus into engagement with the surface to be tested, a pick-up head, means affording a datum for working movements of the stylus approximately normal to the test surface, means for driving the pick-up head, means for transmitting the movement of the pick-up head to the stylus to cause the stylus to be traversed across the test surface, a detector device, clamping means, two normally operative connections respectively between the stylus and the detector device and between the detector device and the pick-up head, at least one of such connections including a coupling rendered effective and ineffective in accordance with operation of the clamping means respectively to cause the detector device to be rendered responsive and effectively unresponsive to the working movements of the stylus, and an instrument operated by the detector device in accordance with the working movements of the stylus during traversing to provide the desired indication or measurement.

2. Measuring or indicating apparatus as claimed in claim 1, in which the detector device consists of a piezo-electric element.

3. Measuring or indicating apparatus as claimed in claim 2, in which the operative connection between the stylus and the detector device consists of a stylus support rigidly connecting the stylus to the detector device, whereby the coupling, when not clamped, permits the stylus support and stylus and the detector device to move as a unit relatively to the pick-up head in a plane approximately normal to the test surface.

4. Measuring or indicating apparatus as claimed in claim 3, including means pivotally connecting the unit comprising the stylus support and stylus and the detector device to the pick-up head about an axis approximately parallel to the test surface.

5. Measuring or indicating apparatus as claimed in claim 4, in which the operative connection between the detector device and the pick-up head includes a detector support for supporting the detector device at a point thereof remote from its connection to the stylus support, such detector support being pivotally connected to the pick-up head about an axis approximately parallel to the test surface, the clamping means acting, when operated, to clamp such detector support to the pick-up head in a position in which the stylus is maintained in engagement with the test surface.

6. Measuring or indicating apparatus as claimed in claim 2, in which the operative connection between the stylus and the detector device includes a stylus support pivotally connected to the pick-up head about an axis approximately parallel to the test surface, and means for maintaining the stylus support in abutting engagement with the detector device, and the operative connection between the detector device and the pick-up head includes a detector support pivotally connected to the pick-up head, the claimping means acting, when operated, to clamp such detector support to the pick-up head and, when not operated, permitting the stylus and the detector device to move relatively to each other and to the pick-up head.

7. Measuring or indicating apparatus as claimed in claim 1, in which the operative connection between the stylus and the detector device consists of a stylus support rigidly connecting the stylus to the detector device, whereby the coupling, when not clamped, permits the stylus support and stylus and the detector device to move as a unit relatively to the pick-up head in a plane approximately normal to the test surface.

8. Measuring or indicating apparatus as claimed in claim 7, including means pivotally connecting the unit comprising the stylus support and stylus and the detector device to the pick-up head about an axis approximately parallel to the test surface.

9. Measuring or indicating apparatus as claimed in claim 8, in which the means for urging the stylus into engagement with the test surface comprises a spring acting on the stylus support.

10. Measuring or indicating apparatus as claimed in claim 1, in which the operative connection between the stylus and the detector device includes a stylus support pivotally connected to the pick-up head about an axis approximately parallel to the test surface and means for maintaining the stylus support in abutting engagement with the detector device, and the operative connection between the detector device and the pick-up head includes a detector support pivotally connected to the pick-up head, the clamping means acting, when operated, to clamp such detector support to the pick-up head and, when not operated, permitting the stylus and the detector device to move relatively to each other and to the pick-up head.

11. Measuring or indicating apparatus as claimed in claim 1, in which the coupling includes a member movable when the coupling is ineffective about a pivot axis parallel to the test surface, and the clamping means includes a pair of jaws which on operation of the clamping means exert a gripping force on such member in a direction parallel to such pivot axis.

12. Measuring or indicating apparatus as claimed in claim 11, in which the two clamping jaws and the member between them are made of magnetizable material, and the clamping means comprises a magnetic circuit of which such jaws and such member form part, at least one coil linked with such magnetic circuit, and means for energising such coil to electromagnetically cause the two jaws to move into gripping engagement with the member between them.

13. Measuring or indicating apparatus as claimed in claim 12, in which the detector device consists of a bar-shaped piezo-electric element cooperating at one end with the operative connection to the stylus, the other end of such element being rigidly connected to the member between the two jaws of the clamping means.

14. Measuring or indicating apparatus as claimed in claim 11, in which the detector device consists of a bar-shaped piezo-electric element cooperating at one end with the operative connection to the stylus, the other end of such element being rigidly connected to the member between the two jaws of the clamping means.

15. Measuring or indicating apparatus as claimed in claim 1, including a starting device for initiating a traversing movement of the stylus across the test surface, and means for automatically operating such clamping means after such traversing movement has been initiated.

16. Measuring or indicating apparatus as claimed in claim 1, including a starting device for initiating an automatic cycle of operations including a traversing movement of the stylus across the test surface, an electric motor constituting the means for driving the pick-up head, an electric switch controlling the energisation of the electric motor, means for causing such switch to close due to operation of the starting device and thereby to start up the electric motor, a cam driven by the electric motor, means for causing the cam to perform a set of operations in an appropriately spaced sequence, such set of operations comprising operation of the clamping means, establishment of an operative connection between the detector device and the measuring or indicating instrument, breaking of such operative connection, release of the clamping means, and finally opening of the electric switch for de-energizing the electric motor, and means controlling the electric motor to cause the operative traversing movement of the stylus to be effected throughout the period when the operative connection between the detector device and the instrument is established and thereafter, to cause the pick-up head to be returned to its starting position.

17. Apparatus for measuring or indicating the roughnesses or undulations of a surface, comprising a stylus, spring means for urging the stylus into engagement with the surface to be tested, a pick-up head, means carried by the pick-up head providing a datum for working movements of the stylus approximately normal to the test surface, means for driving the pick-up head, means for transmitting the movement of the pick-up head to the stylus to cause the stylus to be traversed across the test surface, a detector device constituted by a piezoelectric element, two normally operative connections respectively between the stylus and the detector device and between the detector device and the pick-up head, at least one of such connections including a breakable coupling for rendering the detector device relatively unresponsive to the working movements of the stylus, electromagnetic means for making the breakable coupling operative to render the detector device responsive to the working movements of the stylus, and an instrument operated by the detector device in accordance with the working movements of the stylus during the traversing movement to provide the desired indication or measurement.

18. Measuring or indicating apparatus as claimed in claim 17, in which the operative connection between the stylus and the detector device includes a stylus support pivotally connected to the pick-up head about an axis approximately parallel to the test surface and means for maintaining the stylus support in abutting engagement with the detector device, and the operative connection between the detector device and the pick-up head includes a detector support pivotally connected to the pick-up head, the electromagnetic means acting, when operated, to clamp such detector support to the pick-up head and, when not operated, permitting the stylus and the detector device to move relatively to each other and to the pick-up head.

19. Measuring or indicating apparatus as claimed in claim 17 including a detector support for supporting the detector device and on which the spring means acts for urging the stylus into engagement with the test surface, such spring means also acting when the breakable coupling is inoperative to stress the detector element, and means for cutting the spring means out of action and for causing the stylus to remain urged into engagement with the test surface by the stressing of the detector element when the electromagnetic means is operated to make operative the breakable coupling.

20. Apparatus for measuring or indicating the roughness or undulations of a surface comprising a stylus, a stylus support, spring means acting on the stylus support for urging the stylus into engagement with the surface to be tested, a pick-up head, means affording a datum for working movements of the stylus approximately normal to the test surface, means for driving the pick-up head, means for transmitting the movement of the pick-up head to the stylus to cause the stylus to be traversed across the test surface, a detector device constituted by a piezoelectric element rigidly connected to the stylus support, means for pivoting the unit comprising the stylus support and stylus and the detector support to the pick-up head, a normally operative connection between the detector device and the pick-up head including a breakable coupling for permitting the unit comprising the stylus support and stylus and the detector support to pivot relatively to the pick-up head, to render the detector device relatively unresponsive to the working movements of the stylus, electromagnetic means for making the breakable coupling operative, to render the detector device responsive to the working movements of the stylus during the traversing movement, an instrument for providing the desired indication or measurement and means for causing the detector device to operate such measuring or indicating instrument.

References Cited in the file of this patent

UNITED STATES PATENTS 2,372,451     Reason     Mar. 27, 1945
2,405,133     Brown     Aug. 6, 1946